Nov. 24, 1964 R. J. LANNEN 3,158,032
UNIVERSAL AUTOMATIC BALANCING MACHINE
Filed Nov. 30, 1961 8 Sheets-Sheet 1

INVENTOR.
ROBERT J. LANNEN
BY
Allan J. Murray
ATTORNEY

INVENTOR.
ROBERT J. LANNEN,
BY
ATTORNEY

Nov. 24, 1964    R. J. LANNEN    3,158,032
UNIVERSAL AUTOMATIC BALANCING MACHINE
Filed Nov. 30, 1961    8 Sheets-Sheet 4

Fig. 4

INVENTOR.
ROBERT J. LANNEN
BY
Allan J. Murray
ATTORNEY

Fig. 5

INVENTOR.
ROBERT J. LANNEN,
BY
Allan J. Murray
ATTORNEY

Fig_6

INVENTOR.
ROBERT J. LANNEN
BY
Allan J. Murray
ATTORNEY

Nov. 24, 1964  R. J. LANNEN  3,158,032
UNIVERSAL AUTOMATIC BALANCING MACHINE
Filed Nov. 30, 1961  8 Sheets-Sheet 7

INVENTOR.
ROBERT J. LANNEN
BY Allan J. Murray
ATTORNEY

Fig. 14

United States Patent Office 3,158,032
Patented Nov. 24, 1964

3,158,032
UNIVERSAL AUTOMATIC BALANCING MACHINE
Robert J. Lannen, Detroit, Mich., assignor to Micro-Poise Engineering and Sales Company, Detroit, Mich., a partnership
Filed Nov. 30, 1961, Ser. No. 156,080
8 Claims. (Cl. 73—485)

This invention relates to balance testing machines and particularly machines for universally balancing tires and the like to determine the moment and radial location of any weight imposing a condition of unbalance on such a work piece.

An object of the invention is to provide a machine to consecutively and individually receive and test the balance of tires of different bead diameters, and which adjusts automatically to compensate for a change from one such diameter to a larger or smaller diameter.

Another object is to provide a balance testing machine with a plurality of jaws jointly forming a chuck to release or to firmly grip a tire and to provide means to adjust such jaws to and from a common center so that they will properly grip a tire of any size for which the machine is intended.

Another object is to mount such chuck upon a universally pivoted support to test the balance of a tire engaged by said chuck, and to adapt the chuck to move its jaws to grip a tire, responsive to rotation of a ring about the vertical axis of the pivot, by linking the ring to jaws comprising the chuck.

Another object is to equip each jaw of said chuck with rollers to engage a circumferential surface of a tire, thus minimizing friction arising from continuing rotational actuation of the chuck after some of its jaws have engaged the beads of a tire.

Another object is to provide a chuck of which the jaws are expansible to grip the beads of a tire and to dispose a pair of rollers on each of said jaws to respectively engage the respective beads at a plurality of circumferentially spaced points as the tire is gripped so as to stiffen the tire and establish a substantially consistent cross-sectional form throughout the circumferential extent of such tire.

These and various other objects are attained by the construction hereinafter described and illustrated in the accompanying drawings, wherein.

Summary Description and Explanation

In general terms, and preliminary to a more detailed description and explanation, said drawings disclose a base 1, mounting a chuck assembly 21 for releasably gripping a work piece, such as a tire A, for balancing. An elevator 75 has up and down travel on the base to carry work pieces to and from said chuck. Said elevator is apertured at 92 to allow it to deposit a work piece upon the chuck and remove such work piece therefrom. Any convenient loading means 89 may be used to load a tire on the elevator in the lower position of the latter.

When the elevator rises, it carries upward a newly loaded work piece and also removes from said chuck assembly, and carries upwardly a work piece that has been tested for balance. In its initial position, the newly loaded work piece is engaged by fingers 107 on a transfer arm 106 when the elevator is at its upper limit of travel. Said transfer arm has reciprocable swinging travel whereby it moves the newly loaded work piece from its initial position to a position encircling said aperture 92, whereby said work piece will be deposited upon said chuck when the elevator descends. Said transfer arm then returns to its position to engage the next successively loaded work piece, and when balancing is completed, the elevator rises with the balanced work piece, and with the newly loaded work piece.

Figure 5:
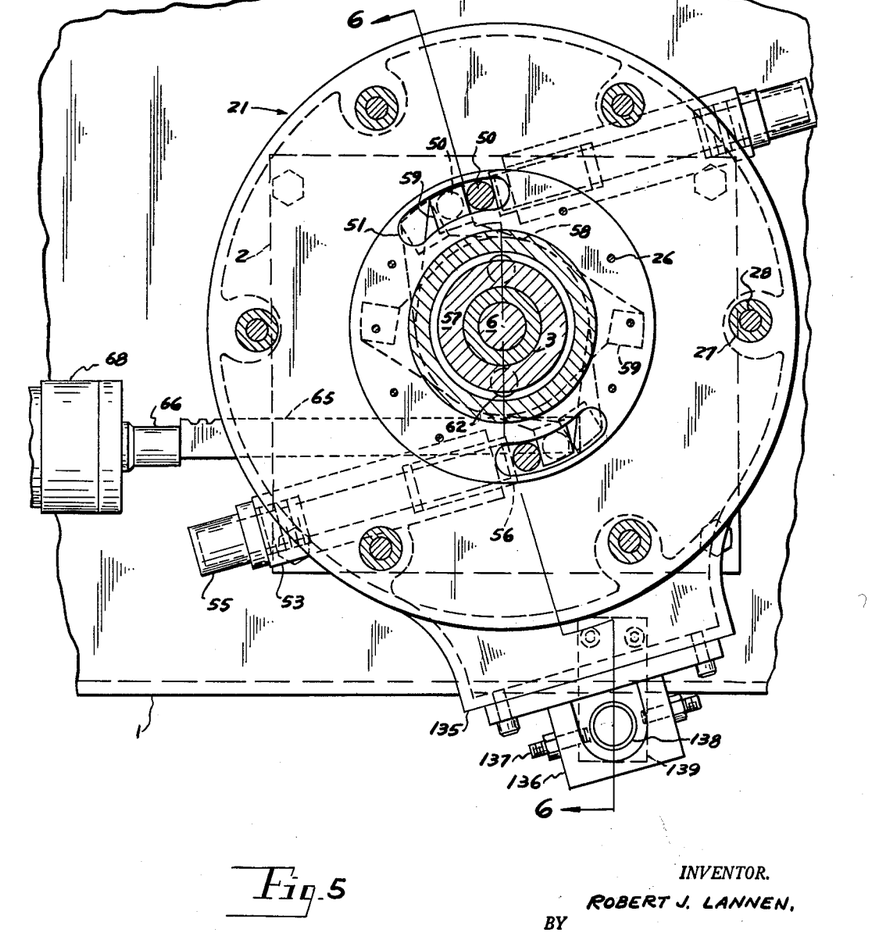
FIG. 5 is a partial, horizontal view of the chuck on line 5—5 of FIG. 2.
Figure 6:
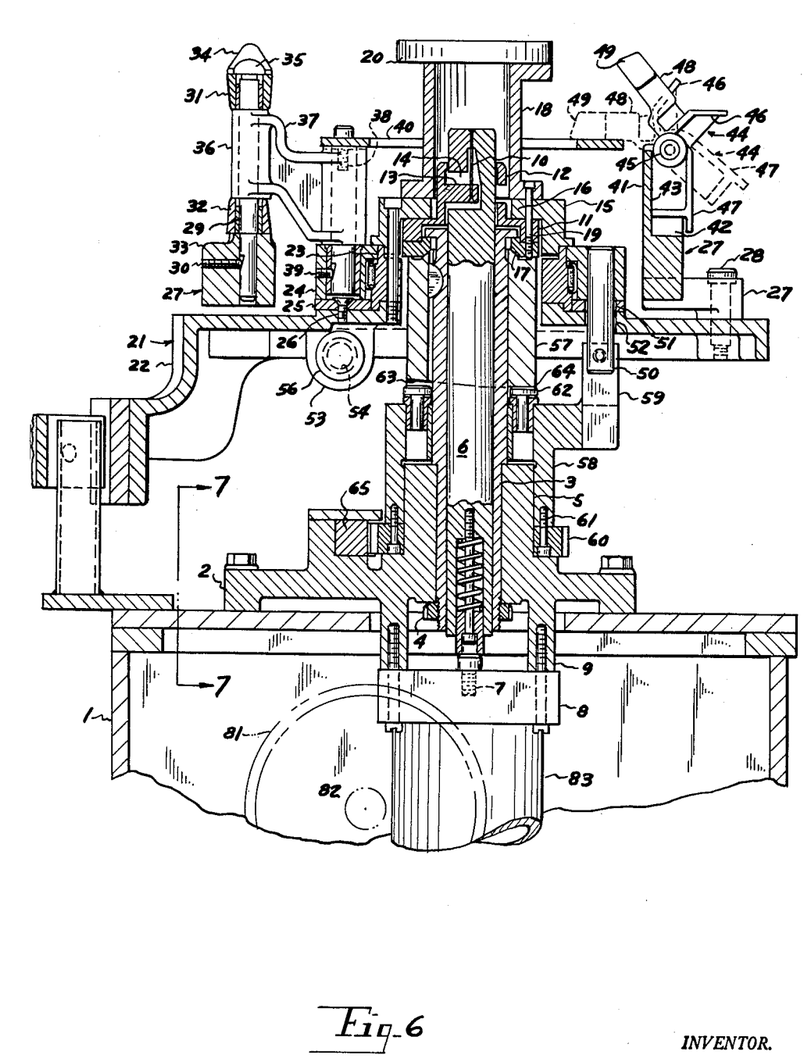
FIG. 6 is a vertical, sectional view of the chuck on line 6—6 of FIG. 5.
Figure 7:
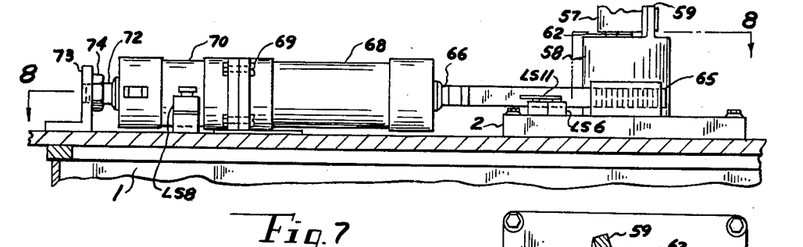
FIG. 7 is a view on line 7—7 of FIG. 1, showing two fluid motors operable to expand and contract the chuck jaws.
Figure 8:
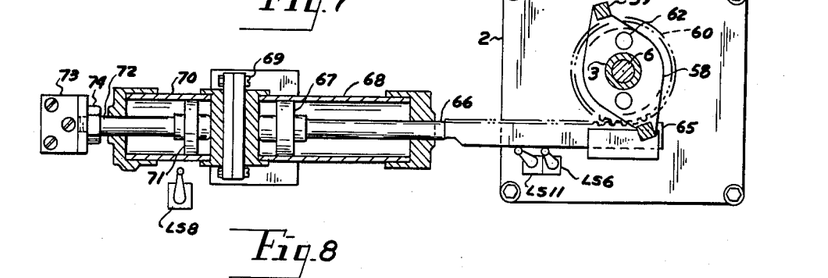
FIG. 8 is a vertical sectional view on line 8—8 of FIG. 7, and with similar FIGS. 9 and 10, shows various positions of said motors to effect different degrees of contraction of the chuck jaws.
Figure 9:
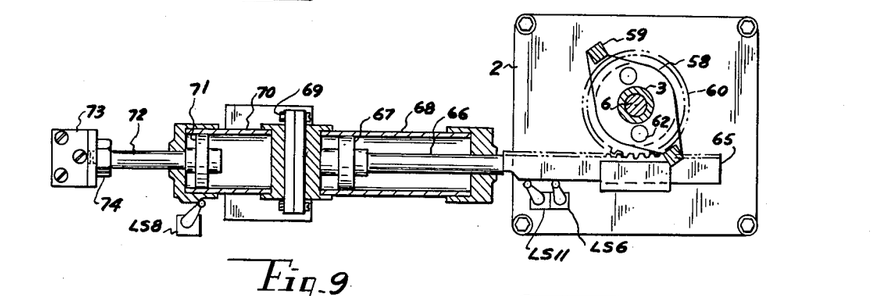
Figure 10:
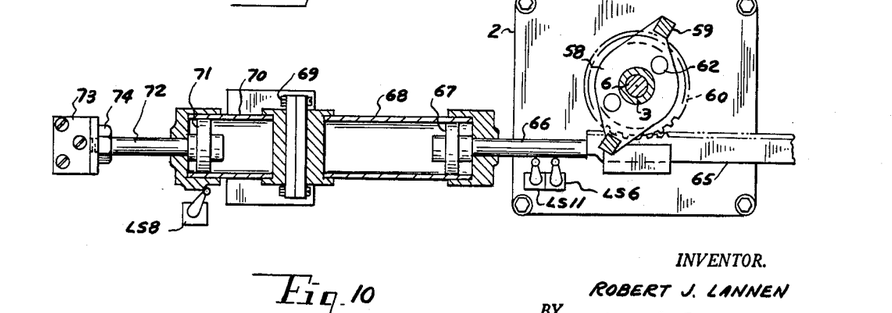

Work Carrier and Its Universal Pivot
(FIGS. 5 and 6)

Surmounting the hollow base 1 of the machine is a plate 2 bolted or otherwise rigidly secured to such base. Upstanding from such plate is a tubular post 3 clamped to the plate by a nut 4 and having its lower end portion received in an annular projection 5 upwardly extending from said plate. Slidably fitted in and projecting above the post is a pin 6 seated at its lower end on the head of an adjusting screw 7 threaded in a plate 8 carried within the base on lugs 9 rigidly depending from the plate 2. Set into the top portion of the pin 6 is a short vertical length of flexible wire 10 forming a universal pivot. The upper end of such wire is rigidly carried by and at the axis of said pin, and its lower end centrally mounts and suspends a work carrier 11 whose upstanding tubular hub 12 has an interior lug 13 affixed to said wire. The hub 12 has adequate annular clearance from the pin to afford a requisite slight tilting of the carrier, and the pin has a slot 14 opening in its periphery to adequately clear the free portion of said wire and accommodate and afford working clearance to the hub 12.

Chuck (FIG. 6)

An inverted cup 15 concentrically encloses the hub 12 and has an inwardly projecting flange 16 resting on the carrier 11. Beneath the carrier is provided an annular plate 17. A tubular pedestal 18 rests on the cup 15 and is surmounted by a bubble indicator 20 to universally indicate the angle and moment of unbalance. Screws 19 maintain said pedestal 18, the cup 15, the hub 12 and said annular plate 17 in assembly. An indicator such as that disclosed in my Patent 2,250,771, issued July 29, 1941, is contemplated, but any indicator that will serve the purpose may be employed.

A chuck assembly 21 has a base 22 (FIGS. 1, 2, 5 and 6) which is disposed beneath the described assembly, and is surmounted by the inner race 23 of a bearing. The outer race of such bearing is formed on the inner circumferential face of a rotor ring 24, which is rotatable about the vertical axis of the chuck assembly on a bearing plate 25 secured by screws 26 to the chuck base.

The jaws of the chuck include a plurality of swinging brackets 27 pivotally mounted on the base 22 as by shoulder screws 28. Spaced on the brackets from said screws 28 are posts 29, retained by set screws 30. An upper roller 31 has a downwardly inclined taper, and is vertically spaced from a lower roller 32, the latter having an upwardly inclined taper. A lug 33 protrudes from beneath said lower roller to support the lower bead of a tire as more fully explained hereinafter. The post 29 upwardly terminates in a conically tapered head 34 formed with oppositely disposed flats 35.

The rollers 31, 32 of each jaw are vertically separated by the sleeve 36 at one end of a swinging link 37. At its other end each link is pivotally secured to said rotor ring 24 by a pivot element 38, having its lower end secured against withdrawal from the ring by a set screw 39. A ring 40 surmounts and joins said links by means of screws 38a received in the upper end portions of said pivot elements.

The central portion 41 of each bracket 27 is upwardly elongated and formed with a vertical groove 42 having a rear wall 43. Levers 44 are pivotally secured in said groove by pins 45. Said levers each includes an arm 46 serving as a seat to receive the upper bead B of a tire A (see FIG. 2). A downwardly extended arm 47 limits rotation in one direction (clockwise in FIG. 6) about the pin 45 by engagement with said rear wall 43 of the groove 42. Another arm 48 limits rotation in the opposite direction by its engagement with the ring 40. A weight 49 is integral with the latter arm, and due to gravity causes said engagement, and normally tends to maintain the position of the lever shown in dash in FIG. 6. When a tire A descends to be deposited on the chuck as explained below, and as shown in dash in FIG. 2, the lower bead C engages the arms 47, forcing them downwardly about the axes of the pins 45, and then slips downwardly from said arm. The arms 46 are then engaged by the upper bead C while the lower bead rests on the aforesaid lug 33. Thus, it is assured that the upper bead of a tire will be properly disposed to be engaged by the upper rollers 31, when the chuck jaws move outwardly responsive to rotation of the rotor 24 as hereinafter explained.

Necessity of Rollers

It is possible that a tire may be deposited upon the chuck in a position eccentric to the vertical axis of the chuck, perhaps with some plurality of the jaws in engagement with the circumferential surface of the tire beads, and the rest of said jaws having maximum, or near maximum clearance from said surfaces. It has been found that when the chuck jaws are constructed as non-rotatable posts, that is, without provision of anti-friction elements to engage the tire beads, those jaws in contact with, or nearest to, said circumferential surfaces of the beads are so quickly and strongly engaged with said surfaces that their frictional contact therewith prevents shifting of the tire to the position most nearly coincident with said vertical axis.

Naturally, this would reduce the accuracy with which the unbalance of a tire is indicated. Resolution of this problem is found in employment of the heretofore described rollers 31, 32, which circumvent the friction imposed upon their bead engaging surfaces and afford shifting of an eccentrically deposited tire to a more nearly concentric position.

Spring Drive to Chuck (FIGS. 5 and 6)

A pair of pins 50 have their upper end portions secured in the rotor ring 24. Said pins extend downwardly therefrom through arcuate slots 51 and 52 formed in the bearing plate 25 and the chuck base 22 respectively. A pair of elongated hollow spring housings 53 are formed on and beneath the chuck base and may be parallel as shown (FIG. 5). A powerful spring 54 is compressed within each housing and retained therein by a hollow retainer 55 threaded into the outer end of said housing and a hollowed piston 56 slidably received in the inner end of said housing. As best seen in FIG. 5, the inner end face of each piston 56 engages against a pin 50. The action of the springs tends to strongly urge said pins, and hence the rotor ring counter-clockwise, with the effect of causing expansion of the chuck jaws to grip the beads of a tire. Such counter-clockwise rotation and resultant expansion of the chuck, are limited by the engagement of the pins 50 with the ends of said slots 51, 52, or by engagement of the chuck jaws with the beads of a tire.

Relief Provision for Universal Pivot (FIGS. 5, 6, 7, 8, 9 and 10)

When a work piece is being deposited upon or removed from the described chuck, it is highly desirable to safeguard the pivot wire 10 from consequent stresses which might otherwise damage or break such wire. For this purpose a locking sleeve 57 is slidably fitted on the post 3 and is afforded a slight up and down actuation responsive to rotation of a crank. Said crank has a hub 58 journaled on said post and on said annular projection 5. A pinion 60 is also journaled on said projection; the hub 58 surmounts said pinion and is secured for rotation therewith by screws 61. Headed pins 62 are carried by said hub in diametrically opposed relation. When said crank is rotated in a clockwise direction, crank arms 59 engage said pins 50 and effect contraction of the chuck jaws as explained below.

The lower face of the sleeve has duplicate helically inclined cams 63 slidably resting upon the heads of said pins, whereby a partial revolution of the pinion will slide said headed pins beneath the cams to slightly raise or lower the sleeve. In raised position, the sleeve slightly elevates the carrier 11 and thus relieves the universal pivot. When lowered, the sleeve sufficiently clears the carrier to afford the latter a slight requisite tilting about the universal pivot.

Provision for Contraction and Expansion of Chuck Jaws

Each of said helically inclined cams 63 terminates in a flat 64. When a partial revolution of the crank, in a clockwise direction, has slid the headed pins from the high point of the cams to the low point thereof, and thence beneath said flats, the locking sleeve 57 has then been raised to the necessary extent to lock the carrier as aforesaid. With continued clockwise rotation of the crank the heads of said pins do not further raise said locking sleeve, but slide beneath said flats 64 and merely maintain said locking sleeve in locked position. The continued clockwise rotation further effects contraction of said chuck jaws as will be seen. Counter-clockwise rotation reverses the sliding travel of the pins from the flats to the high points of the cams, to allow the springs 54 to expand the chuck and to lower the locking sleeve.

As it is desired to process two different size tires on the present construction, provision is made, as described below, whereby the chuck jaws may be contracted to a first position, for deposit thereon or removal therefrom of a tire having, for example, a fourteen inch bead diameter. An additional contraction to a second position may be effected to position said chuck jaws for deposit or removal of a tire of a smaller bead diameter, for example, thirteen inches.

This is requisite to allow the levers 44 to be effective to properly space the beads of a tire. For example, a tire having fourteen inch bead diameter would not engage all of said arms 44 and seat the upper bead at 46, as aforesaid, if the chuck jaws were contracted to the second position, for deposit and removal of a smaller diameter tire, having a thirteen inch bead diameter. Conversely, if the chuck were contracted to the first position, for deposit and removal of a tire having a fourteen inch bead diameter, the smaller tire would be too small to operate the arms 44 properly.

As best seen in FIGS. 5 through 10, the aforesaid pinion 60 is engaged and driven by a rack 65, such drive being imparted to the crank by said screws 61. Said rack has one end engaged with the end of a piston rod 66, operable by a piston 67 slidable in the cylinder of a fluid motor 68. Screws 69 attach a shorter fluid motor 70, end to end with said longer fluid motor. The shorter motor 70 includes piston 71 and piston rod 72. Said piston rod 72 has its end threaded into the vertical flange of an angle bracket 73 which is secured rigidly to the base 1. A nut 74 resists escape of the piston rod 73 from said bracket.

By this arrangement, activation of the short fluid motor 70 results in travel of its cylinder relative to its piston and piston rod. As the cylinders are joined by said screws 69, such travel naturally imparts corresponding travel to the longer fluid motor 68, with its piston, piston rod, and the attached rack 65.

When the piston and piston rod of the fluid motor 68 are driven to the left (as illustrated in the drawings), this effects clockwise rotation of the hub 58. The crank arms 59 engage the pins 50 in the rotor ring 24, to effect clockwise rotation thereof. The pivot elements 38 have been drawn in clockwise travel with the rotor ring, and the swinging links 37, responsive to said travel, and have drawn the chuck jaws 29, 31, 32 inwardly toward the axis of rotation of the chuck to contract said chuck to the first position for deposit or removal of a larger diameter tire. When the shorter fluid motor 70 also drives to the left, the chuck is further contracted to the second position for deposit or removal of a smaller diameter tire.

When the locking sleeve is lowered, and the chuck jaws grip the tire, the weight of the chuck assembly and the tire is borne entirely by the pivot wire 10, for balancing the tire. When the angle and moment of unbalance are determined, the locking sleeve is raised to secure the balancing mechanism against movement while said angle and moment of unbalance are marked on the tire. This entails fluid motor 68 driving to the left. After the tire is marked, as aforesaid, the elevator rises, and fluid motor 70 drives leftwardly to fully contract the chuck, just before the elevator engages the tire.

Rotation Resisting Construction

When released by the fluid motors 68, 70 driving to the right to lower the locking sleeve 57, the springs 54 react with such power to engage the jaws with the bead of a tire that the entire chuck assembly 21 would tend to rotate responsive to such reaction. As the fluid motors 68, 70 quickly lower said locking sleeve, any such rotation would tend to twist the pivot wire 10. To resist such rotation, the chuck base is provided with a protuberance 135, receiving a U-shaped bracket 136. Adjustable stop screws 137 are oppositely disposed in said bracket and when the chuck assembly tends to rotate as aforesaid, one or the other of said screws impacts a tubular stop post 138 secured to a bracket 140 mounted upon the base, thus resisting said rotation.

Elevator

Spaced above the base 1, the elevator 75 is equipped with rollers 76 serving to seat work pieces and facilitate their travel lengthwise of the elevator. Rigidly secured to the elevator end portions are duplicate vertical guide rods 77, extending downwardly into the base and each slidable in upper and lower bearings 78 and 79 fixed on the base. To avert binding of said rods in their bearings, and to provide for their travel in perfect unison, the rods are similarly formed with toothed racks 80 meshed with a pair of duplicate gears 81 similarly fixed on end portions of a horizontal shaft 82 journaled in end walls of the base.

Raising and lowering of the elevator is effected by a fluid motor 83 comprising a piston 84 and its rod 85, vertically reciprocatory in a cylinder 86 rigidly mounted on and within the base. The rod 85 extends freely through an opening 87 in the top plate of the base and has an actuating connection 88 to the elevator. In its lowered position shown in FIG. 2, the loading end of the elevator adjoins a conveyor 89 on which a row of work pieces A await successive delivery to the elevator. Said conveyor is preferably of a driven-roller type, such as will immediately load a work piece on the elevator when the latter assumes its lowered position. A bracket 90, rigidly depending from the loading end of the elevator, blocks any advance of work from the conveyor 89 when the elevator is fully or partially raised. Said bracket is equipped with a row of vertically spaced rollers 91 to minimize friction with the next successive tire during travel of the elevator. An opening 92 in the elevator affords clearance for said chuck.

Figure 1:
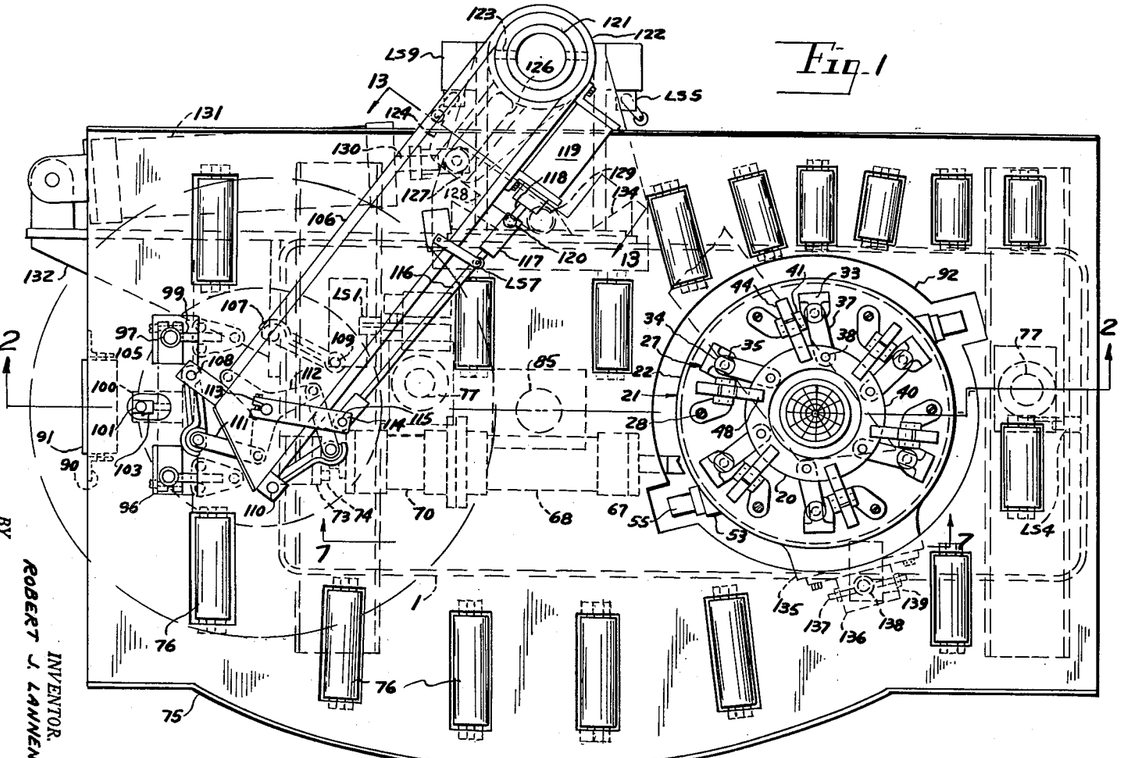
FIG. 1 is a top plan view of the machine.
Figure 2:
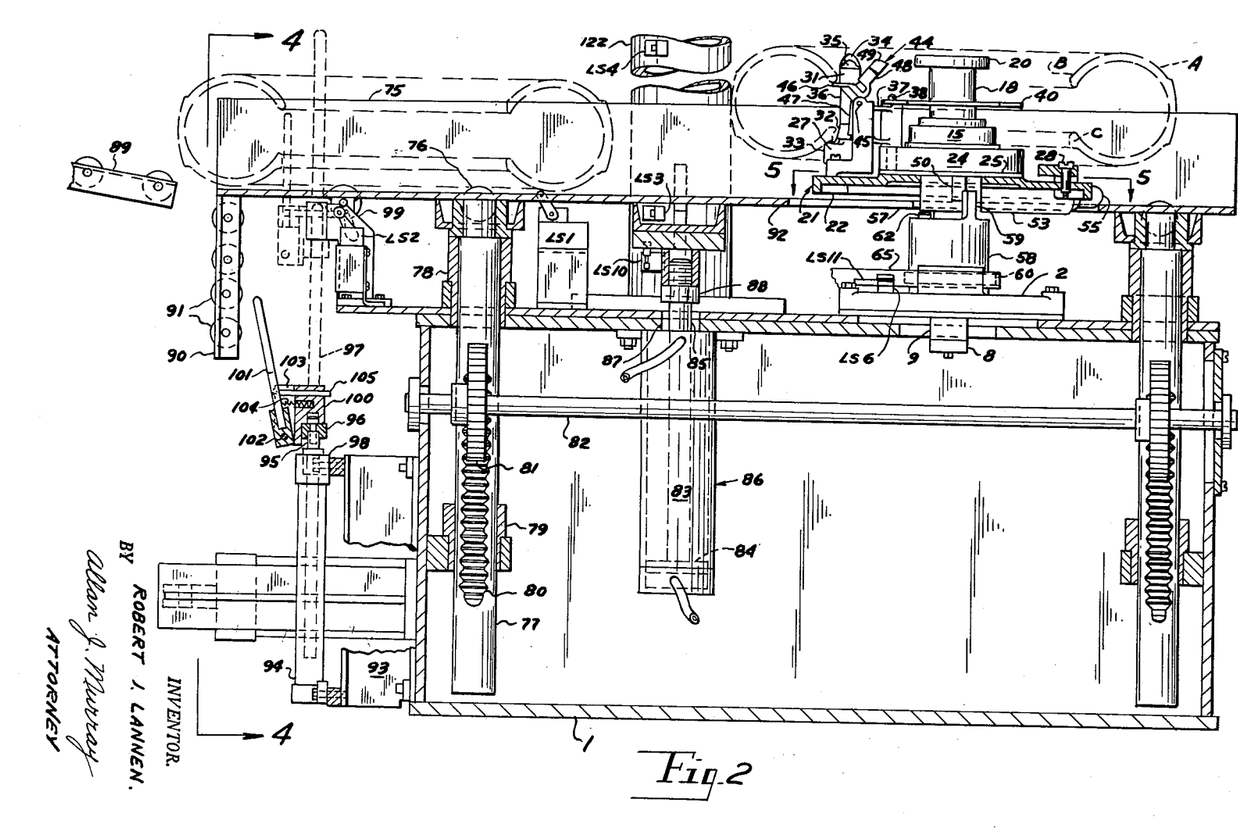
FIG. 2 is a vertical longitudinal sectional view on line 2—2 of FIG. 1, with the elevator at its lower limit.
Figures 3, 11, 12, 13:
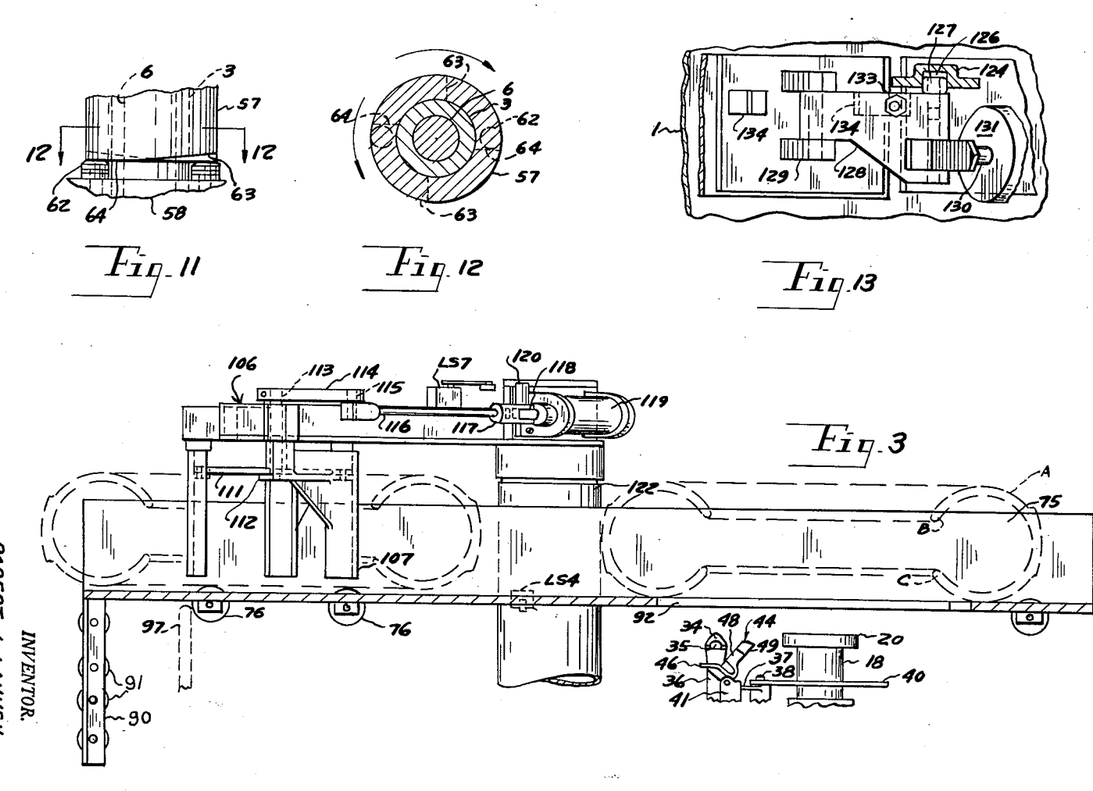
FIG. 3 is a partial view similar to FIG. 2, but showing only the upper portion of the machine with the elevator in its raised position.
FIG. 11 is a partial view in elevation of a tubular locking sleeve.
FIG. 12 is a horizontal sectional view on line 12—12 of FIG. 11.
FIG. 13 is a partial sectional view on line 13—13 of FIG. 1 showing an end of a fluid motor and a crank actuable by said motor.
Figure 4:
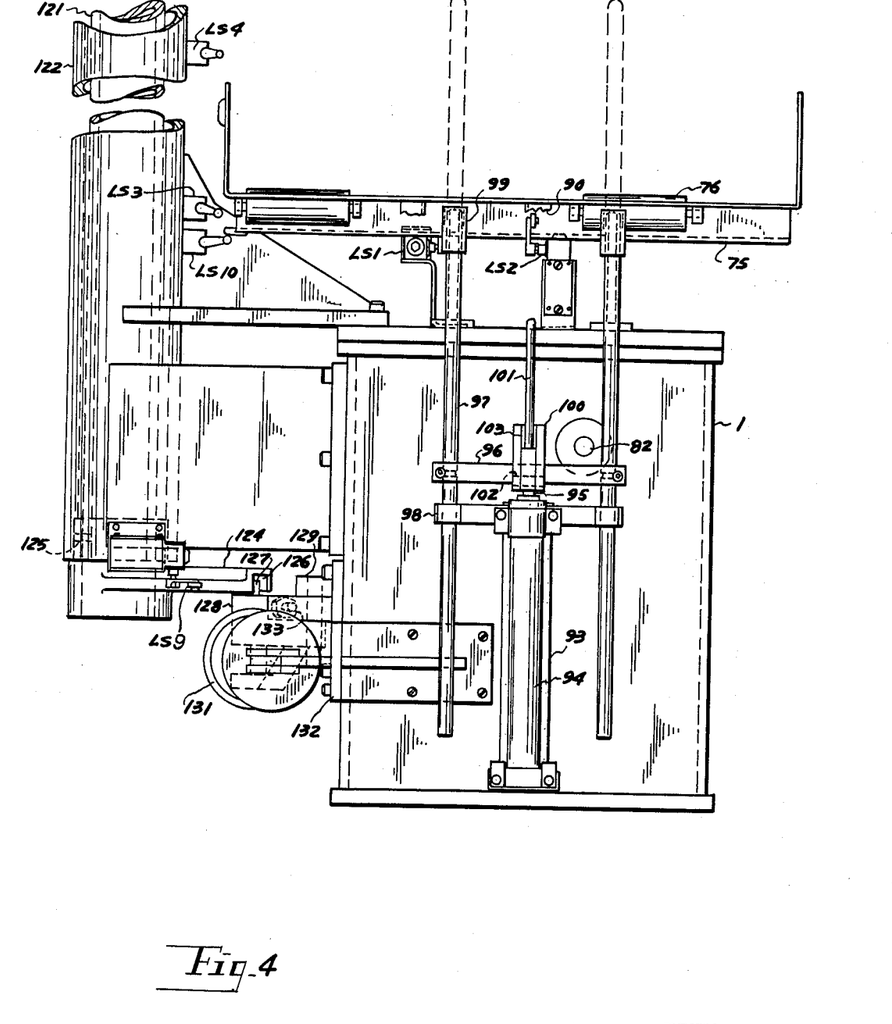
FIG. 4 is an end view in elevation on line 4—4 of FIG. 2.

Work Piece Locator Rods (FIGS. 1, 2, and 4)

An I-beam 93 is secured to the loading end of the base and mounts a fluid motor 94. The piston rod 95 of said motor upwardly terminally carries a bracket 96, elongated laterally of the base, and securing for up and down travel in unison a pair of work piece locator rods 97. A guide member 98 is mounted at the top of the fluid motor 94 to stabilize the lower portion of the rods 97 in said travel. The upper portions of said rods travel in guide sleeves 99 mounted atop said base.

The bracket 96 centrally carries a block 100 which at 102 pivotally retains a pin 101. The block is formed with a socket 103 receiving a spring 104. Said spring reacts against the pin, urging it to pivot in the direction of said conveyor 89. A slide rod 105 has an end pivotally secured to the pin and extends slidably through said block 100 toward the base 1.

When the elevator reaches the lower limit of its travel, a tire moves from the conveyor 89 to a loaded position on the elevator, closing a switch LS1 whereby the fluid motor 94 is activated, as hereinafter explained, to quickly drive the piston rod 95 upwardly. The work piece locator rods 97 are carried up to encounter a tire A as it is loaded upon the elevator. Said rods engage the bead of a tire to position the tire for subsequent transfer on the elevator as hereinafter explained. The bead of such tire also engages the pin 101, pivoting such pin toward the base, and driving the slide rod 105 through the block to close a switch LS2 with results hereinafter discussed.

Transfer Arm and its Drive Means (FIG. 1)

When the elevator rises, it positions the newly loaded tire so that the beads of the tire encircle a plurality of gripping fingers 107 depending and elongated vertically beneath an arm 106, hereinafter termed the transfer arm. Said fingers are mounted on pivot elements 108, 109, and 110 which have their upper ends fixed on the transfer arm. Links 111 each have one end pivotally secured to a gripping finger and have their other ends similarly pivoted to the arms of a spider 112.

The spider is rigidly carried beneath the transfer arm by a rock shaft 113 which extends upwardly through the transfer arm and has its projecting upper end portion engaged by an end of a crank arm 114. The other end of said arm 114 pivotally connects at 115 with a rod 116, and the opposite end of said rod has a pivotal connection with the projecting end of a piston rod 118 of a fluid motor 119. Upstanding from said latter connection is a pin 120, which may operate a switch LS7, the purpose of which is hereinafter explained.

The transfer arm surmounts a tubular rock shaft 121, journalled in a tubular housing 122, and said transfer arm is secured by pins 123 for rotation with said tubular rock shaft. The lower end of said tubular rock shaft is received in the body of a crank arm 124, and interconnected to such body by a pin 125. The crank arm 124 is formed with an upwardly recessed channel 126. A roller 127 travels in said channel and is mounted on a swinging arm 128, which arm is pivotally mounted on the base at 129.

Said arm is pivotally connected to and driven by a piston rod 130 of a fluid motor 131. A bracket 132 is secured to the loading end of the base to pivotally mount the rearward end of said fluid motor. The swinging arm 128 is provided with a screw 133 which engages stop blocks 134 at either end of its swinging travel to limit such travel. The crank arm 124 alternatively closes switches LS9 and LS5 at the limits of its swinging travel, for purposes explained below.

When the elevator reaches the upper limit of its travel, it closes switch LS4 whereby the fluid motor 119 is activated to drive piston rod 118 forwardly, turning rock shaft 113 and thus extending the fingers 107 to grip the tire by the beads thereof. Concurrently, the fluid motor 131 is activated to swing the transfer arm rightwardly in FIGS. 1 and 2 to dispose said newly loaded tire on the elevator for deposit upon the chuck. The newly loaded tire engages the tire previously balanced and marked, discharging the latter from the elevator. Any desired construction may be provided to receive tires so discharged.

When the transfer arm reaches the end of its swinging travel, the crank arm 124 closes switch LS5, causing the fingers 107 to retract. Also, the elevator descends to deposit the tire upon the chuck, and receive a newly loaded tire from the conveyor 89.

*Electrical Diagram and Operation (FIG. 14)*

An operating cycle may be said to begin with delivery of a tire A from the conveyor 89 to the elevator, then lowered as per FIG. 2. The lower face of such tire closes a normally open switch LS1, in line 137, to energize a solenoid S1. Such solenoid controls a valve (not shown) to activate fluid motor 94, raising the locator rods 97 and pin 101. Said rods and pin are raised quickly enough to engage said rods with the bead of the tire, halting further advance of the tire on to the elevator and locating or positioning the tire for subsequent steps in the cycle. The pin 101 is also engaged by one or both beads of the tire and consequently is swung about its pivot 102 so that the slide rod 105 closes normally open switch LS2, in a circuit including lines 138, TR2 and S2.

Figure 14:
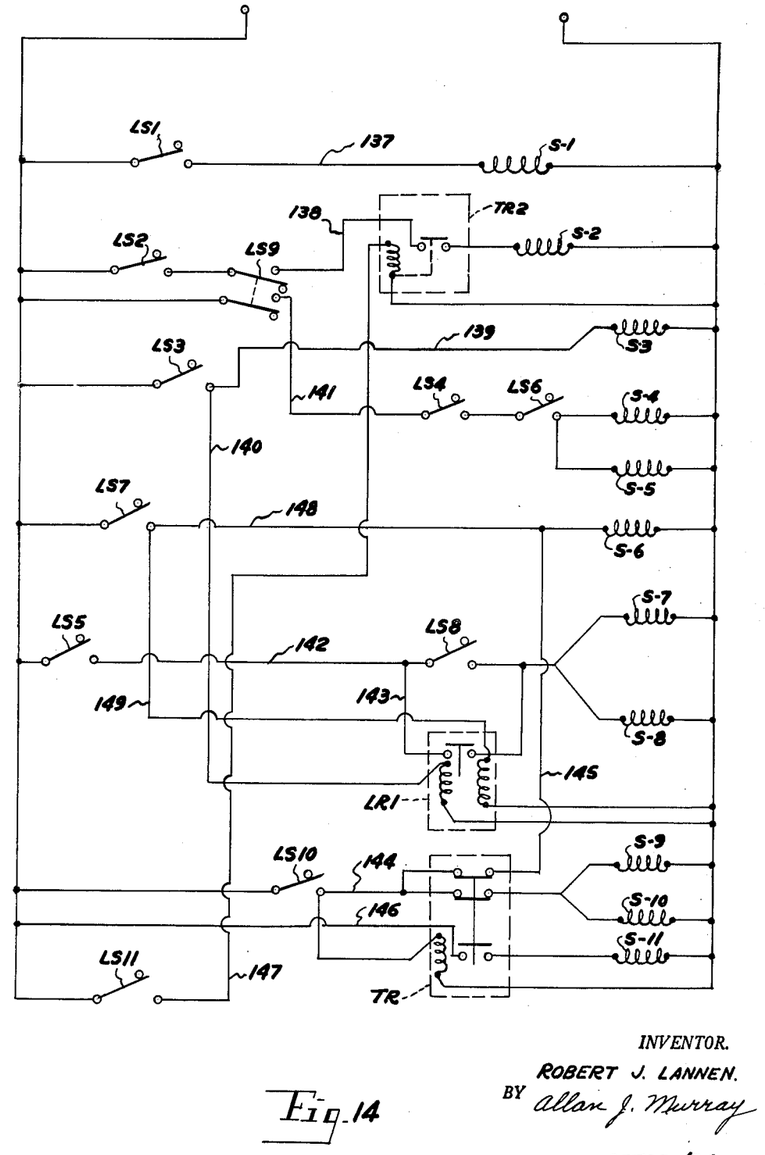
FIG. 14 is a diagram illustrating electrical controls to automatically operate the machine.

A normally open switch LS9, at the base of the tubular housing 122 has been previously closed as explained below, and is held closed by the aforesaid crank arm 124 due to the position of the transfer arm 106 and its tubular rock shaft 121. Thus, closing of said switch LS2 prepares a circuit through line 138 to effect raising of the elevator 75, when a time relay TR2 operates. Operation of said time relay closes said circuit and energizes a solenoid S2 which with solenoid S8 (in another circuit) controls a valve (not shown), and has an effect on said valve opposite to that of said latter solenoid, to activate fluid motor 83 to drive the elevator upwardly. Such valve will continue to so activate said fluid motor until oppositely affected by solenoid S8.

Switch LS1 opens when the weight of the tire is lifted therefrom by the elevator, and as solenoid S1 is deenergized, the valve affected thereby is reversely operated by a spring (not shown), to allow descent of the locator rods 97 and pin 101. Withdrawal of said pin allows switch LS2 to open.

As the elevator rises, it momentarily closes a switch LS3. Such switch controls a circuit including line 139, and solenoid S3 which jointly with solenoid S6 (in another circuit) controls a valve (not shown), and has an effect on such valve opposite to that of said latter solenoid. Energization of solenoid S3 affects said valve to activate fluid motor 70 to contract the chuck to said second position. LS3, through line 140, further energizes a coil in latch relay LR1, closing the contacts of said relay.

When the elevator reaches the upper limit of its travel, a switch LS4 is closed. LS4 is disposed in a circuit including line 141, and LS6, which, of course, must be closed to make the circuit operative. Also, in said circuit is solenoid S4, which with solenoid S7 (in another circuit) controls a valve (not shown), and has an effect on said valve opposite to that of said latter solenoid. When energized, solenoid S4 affects said valve to activate fluid motor 119 to extend the fingers 107 on the transfer arm 106 to engage the beads of a tire. Said circuit also includes solenoid S5, which, with solenoid S10 (in another circuit) controls a valve (not shown) and has an effect on such valve opposite to that of said latter solenoid. When energized, solenoid S5 affects said valve to activate fluid motor 131 to swing the transfer arm (to the right as illustrated in the drawings) to dispose the tire for deposit upon the chuck.

However, when the longer fluid motor 68 is activated to raise the locking sleeve 57 and lock the balancing unit, the rack 65 closes the aforesaid switch LS6. Such switch serves as a safety measure, and, if open, prevents swinging of the transfer arm; thus, if fluid motor 68 fails to raise the locking sleeve, the cycle of the machine is interrupted, and the elevator cannot then deposit a tire on the chuck and possibly cause damage to the pivot wire 10 which would have to absorb the shock of the abrupt deposit of the tire on the chuck if such safety measure were not provided.

It will be noted that the aforesaid switch LS9 is a double switch, and in addition to controlling the earlier described circuit including LS2, TR2, and S2, LS9 controls the just described circuit including LS4, LS6. This latter circuit as can be seen from the diagram, FIG. 14, is independent of LS9.

With the elevator up, and the chuck contracted to receive the smaller diameter tire, such a smaller diameter tire is swung into position for deposit on the chuck, as aforesaid. When said transfer arm reaches the limit of its travel, the crank arm 124 closes a switch LS5 mounted at the base of the tubular housing 122. Thus, current may flow through lines 142, 143, and latch relay LR1 (previously closed by closing of LS3) to energize solenoid S7, which reverses the effect of solenoid S4 on their jointly controlled valve, to activate fluid motor 119 to contract the fingers 107 of the transfer arm 106. Solenoid S8 is also energized when LS5 closes, and reverses the effect of solenoid S2 on their jointly controlled valve to activate fluid motor 83 to lower the elevator. When the transfer arm swings to position the tire on the elevator, switch LS9 is allowed to open, breaking the circuits to S2, S4, and S5, so that having previously had the desired effect on their respective valves, said solenoids are then deenergized, and cannot subsequently oppose said reverse effect upon such valves of solenoids S7, S8, and subsequently, S10.

When the elevator reaches the lower limit of its travel, a switch LS10 is closed. This, through line 144, affects time relay TR1 to close a circuit through line 145 to solenoid S6, reversing the effect of solenoid S3 on their jointly controlled valve, to activate fluid motor 70 to drive rightwardly.

TR1 also affords energization of solenoid S9, which, with solenoid S11 (in another circuit) controls a valve (not shown), and has an effect upon such valve opposite to that of the latter solenoid. When energized, solenoid S9 activates fluid motor 68 to drive rightwardly. Thus, the locking sleeve 57 is lowered, suspending the weight of the tire and chuck on the pivot wire 10 for balancing, and the chuck jaws are allowed to expand under urging of the springs 54 to grip the beads of the tire. Time relay TR1 affords adequate time for an operator to note the moment and angle of an unbalance on the bubble indicator 20.

TR1 further energizes solenoid S10, which reverses the effect of solenoid S5 on their jointly controlled valve, to activate fluid motor 131 to swing the transfer arm in return travel to its starting position, closing aforesaid switch LS9.

When a predetermined time has lapsed, the time relay TR1 operates and the circuits to solenoids S6, S9 and S10 are opened, and a circuit through line 146 to solenoid S11 is closed, energizing said latter solenoid to reverse the effect of S9 and affect their jointly controlled valve to activate fluid motor 68 to drive to the left, contracting the chuck to the first position.

When fluid motor 68 is so activated, the rack closes switch LS11, which is disposed in a circuit including line 147 affecting time relay TR2. Such relay affords enough time for the operator to appropriately mark the tire (such marking may be accomplished automatically, if desired). While the tire is being balanced, a new tire is loaded on the elevator by the conveyor 89 and closes LS1. The locator rods 97 are driven upwardly to position said tire, and the pin 101 closes LS2 as previously described. LS9 is closed by return of the transfer arm. When time relay TR2 operates, a circuit is completed to solenoid S2 to send the elevator up again.

When the elevator in its upward travel closes LS3 the shorter fluid motor 70, as hereinbefore described, is activated to contract the chuck to receive the *smaller* diameter tire. Thus, when, at the upper limit of its upward travel, the elevator closes LS4, the chuck is always set in the second position for deposit of the smaller diameter tire.

However, when a *larger* diameter tire is received on the elevator, and the elevator has risen, the fingers 107 on the transfer arm 106, are afforded greater travel to engage the beads of such tire. This additional travel allows the pin 120 on the clevis 117 to close switch LS7 in line 148. This closes a circuit energizing solenoid S6 to affect its valve to activate fluid motor 70 to assume the position shown in FIG. 9, expanding the chuck to the first position to receive a larger diameter tire. LS7 also closes a circuit through line 144 affecting latch relay LR1 causing its contacts to open. When fluid motor 70 is activated as described immediately above, it operates switch LS8, closing a circuit through line 142 to solenoids S7 and S8. Thus, when LS5 is closed by swinging travel of the transfer arm, LR1 has been open, but LS8 has been closed to conduct current to solenoids S7 and S8. Hence, if for any reason, fluid motor 70 fails to respond to closing of LS7, then LS8 will remain open, and, as LR1 is also open, the elevator cannot descend until the situation is corrected.

Assuming the operation proceeds normally, however, and the elevator descends to close LS10, the sequence from that point is similar to that described for a small diameter tire. TR1 operates, and solenoid S11 causes fluid motor 68 to raise the locking sleeve, contracting the chuck jaws to the first position. LS11 is closed by said action of fluid motor 68; TR2 operates, causing fluid motor 83 to raise the elevator. Just before it contacts the tire, the elevator closes LS3, causing contraction of the chuck to said second position.

What I claim is:

1. In a machine for testing the universal balance of pneumatic tires of two predeterminedly disparate diametrical sizes, fed continuously to the machine in a random sequence of such sizes, the combination with a carrier, an upright support for such carrier, means universally pivoting the carrier on the support substantially at a vertical axis, and a frame, mounting said support, of
   (a) a plurality of work clamping jaws supported by the carrier to move toward said axis to alternatively occupy one of two positions for deposit or removal of a tire, said positions respectively accommodating said respective sizes, and away from said axis to a clamping position upon a circumferential surface of any such tire,
   (b) a ring rotatable about said axis,
   (c) actuating connections from said ring to said jaws,
   (d) a first drive means to rotate said ring to cause said actuating connections to move said jaws alternatively to assume said alternative positions, and normally to one position for one diametrical size, rather than the other position,
   (e) a second drive means urging said jaws toward said clamping position,
   (f) means to deliver a tire to and from said chuck, and
   (g) means engageable with said circumferential surface to position a tire on said delivery means for deposit thereby upon said chuck when said jaws are appropriately positioned,
   (h) control means responsive to said engagement by said means (g) with a circumferential surface of one diametric size to cause said first drive means (d) to move said jaws (a) to said other position, for deposit or removal of a tire of said diametric size so engaged.

2. In a machine as set forth in claim 1, said means to position a tire including a transfer arm, support means mounting said transfer arm for substantially horizontal swinging travel thereon, and a plurality of gripping elements disposed upon and beneath said arm and spaced from said support means, and actuable in reciprocable travel from and to a common axis to grip or release the circumferential surface of a tire, the diameter of such surface establishing the limit to said reciprocable travel from said common axis.

3. In a machine as set forth in claim 2, drive means to drive said gripping elements in said reciprocable travel and limiting such travel to said common axis,
   (i) and control means actuable at the limit of travel from said common axis, established by the larger diameter tire, to control said first mentioned drive means to position the chuck jaws for deposit thereon or removal therefrom of a tire having the larger diameter.

4. In a machine as set forth in claim 3, said last mentioned drive means including a motor mounted on said arm and connecting means extending from said motor to said gripping elements, and said control means being mounted on the arm and operable by said connecting means at said limit of said travel from said common axis established by said larger diameter tire.

5. In a universal automatic balancing machine, the combination with an elevator having opposed loading and unloading ends and means for actuating the elevator between raised and lowered positions, of
   (a) means for delivering substantially circular workpieces sequentially to the elevator in its lowered position and at its loading end,
   (b) an elongated arm for transferring workpieces sequentially from the loading to the unloading end of the elevator,
   (c) means for pivotally mounting said arm substantially at one of its ends and at one side of the elevator for swinging about a substantially vertical axis,
   (d) means carried by said arm at its other end for gripping a circumferential face of a workpiece, said arm projecting above the elevator from its said pivotal end to said gripping means,
   (e) mechanism for activating said gripping means preliminary to swinging said arm, and
   (f) a balance testing mechanism positioned to sequentially receive workpieces from the elevator at said unloading end.

6. A universal automatic balancing machine as set forth in claim 5, said gripping means being installed on said transfer arm.

7. In a chuck for testing the universal balance of pneumatic tires, the combination with a carrier, an upright support for such carrier, and means universally pivoting the carrier on the support substantially at a vertical axis, of (a) a base, comprising a portion of said carrier,
(b) a ring rotatable on said base about said axis,
(c) a plurality of work clamping jaws supported by the base for travel between alternative positions for deposit and removal of a tire, and a position for clamping upon the circumferential surface of a tire,
(d) actuating connections pivotally connecting said jaws and said ring to effect said travel responsive to rotation of said ring,
(e) spring means effective on said ring to rotate said ring to establish said jaws in said clamping position,
(f) drive means effective on said ring to oppose said spring and reversely rotate said ring to establish said jaws in one of said first mentioned positions,
(g) said jaws including elongated posts having longitudinal axes substantially parallel to said vertical axis and pivotally mounting a portion of said actuating connections,
(h) a pair of rollers carried by each said post, said rollers being spaced apart by said portion of said actuating connection to engage spaced portions of a tire and avert frictionally occasioned distortion of such tire by non-uniform engagement thereof by said jaws.

8. In a chuck as set forth in claim 7, said jaws being disposed to engage the beads of a tire, and said pairs of rollers being predeterminedly spaced to engage said beads, and each respective roller being formed with a taper to accommodate the contour of a respective bead of a tire.

References Cited by the Examiner

UNITED STATES PATENTS

| 2,220,404 | 11/40 | Hulslander | 73—485 |
| 2,349,288 | 5/44 | Lannen | 73—485 |
| 2,481,125 | 9/49 | Lannen | 73—485 |
| 2,898,764 | 4/59 | Kinsey et al. | 73—483 |

FOREIGN PATENTS 1,228,606  3/60  France.

RICHARD C. QUEISSER, *Primary Examiner.*

JAMES J. GILL, ROBERT EVANS, *Examiners.*